United States Patent
Eddi et al.

(10) Patent No.: US 10,640,939 B2
(45) Date of Patent: May 5, 2020

(54) WAVE ENERGY CONTROL DEVICE

(71) Applicants: Centre National de la Recherche Scientifique, Paris (FR); Sorbonne Université, Paris (FR)

(72) Inventors: Antonin Eddi, Paris (FR); Lucie Domino, Paris (FR); Marc Fermigier, Paris (FR)

(73) Assignees: Centre National de la Recherche Scientifique, Paris (FR); Sorbonne Université, Paris (FR)

( * ) Notice: Subject to any disclaimer, the term of this patent is extended or adjusted under 35 U.S.C. 154(b) by 0 days.

(21) Appl. No.: 16/497,720

(22) PCT Filed: Mar. 29, 2018

(86) PCT No.: PCT/FR2018/050791
§ 371 (c)(1),
(2) Date: Sep. 25, 2019

(87) PCT Pub. No.: WO2018/178590
PCT Pub. Date: Oct. 4, 2018

(65) Prior Publication Data
US 2020/0032470 A1   Jan. 30, 2020

(30) Foreign Application Priority Data

Mar. 30, 2017 (FR) .................................. 17 52718

(51) Int. Cl.
*E02B 3/06* (2006.01)
*E02B 9/08* (2006.01)

(52) U.S. Cl.
CPC ................ *E02B 3/062* (2013.01); *E02B 9/08* (2013.01)

(58) Field of Classification Search
CPC combination set(s) only.
See application file for complete search history.

(56) References Cited

U.S. PATENT DOCUMENTS 3,188,813 A * 6/1965 Foster ..................... E02B 3/062
 405/27
4,255,066 A   3/1981 Mehlum
(Continued)

FOREIGN PATENT DOCUMENTS

WO   2018178590 A1   10/2018

OTHER PUBLICATIONS

Foreign Communication from a Related Counterpart Application, International Search Report dated Jul. 24, 2018, International Application No. PCT/FR2018/050791 filed on Mar. 29, 2018.
(Continued)

*Primary Examiner* — Kyle Armstrong

(57) ABSTRACT

The present invention relates to a system and device (1000) for controlling hydroelastic surface waves and to the use thereof.

In particular, the invention relates to a system for controlling hydroelastic waves propagating over the surface of a liquid (1), the controlling system comprising a floating composite structure (10) having at least two zones Z1 and Z2 the respective bending coefficients D1 and D2 and/or the shapes of which are adapted to control the propagation of the hydroelastic waves, and for which it is possible to define an index $n_i$, i being equal to 1 or 2, similar to the refractive index of an optical medium.

The controlling system thus allows the propagation of the hydroelastic waves to be able to be controlled by applying the laws of geometric optics.

11 Claims, 5 Drawing Sheets

(56) References Cited

U.S. PATENT DOCUMENTS

| | | | | |
|---|---|---|---|---|
| 4,836,709 | A * | 6/1989 | Ploeg | E02B 3/06 |
| | | | | 405/31 |
| 8,561,221 | B2 * | 10/2013 | Lochtefeld | E04H 4/0006 |
| | | | | 4/491 |
| 9,303,617 | B2 | 4/2016 | Chao et al. | |
| 10,550,534 | B1 * | 2/2020 | Neelamani | E02B 3/06 |
| 2008/0050178 | A1 * | 2/2008 | Erlingsson | E02B 3/06 |
| | | | | 405/21 |
| 2009/0175685 | A1 * | 7/2009 | Bowers | E02B 1/003 |
| | | | | 405/52 |
| 2014/0260236 | A1 | 9/2014 | Barker et al. | |
| 2017/0234292 | A1 * | 8/2017 | Velasco | F03B 15/14 |
| | | | | 290/43 |

OTHER PUBLICATIONS

Foreign Communication from a Related Counterpart Application, Written Opinion dated Jul. 24, 2018, International Application No. PCT/FR2018/050791 filed on Mar. 29, 2018.

* cited by examiner $$i_1 > i_{lim} = arcsin\left(\frac{n_2}{n_1}\right)$$

$n_1 < n_2$

WAVE ENERGY CONTROL DEVICE

CROSS-REFERENCE TO RELATED APPLICATIONS

The present application is a filing under 35 U.S.C. 371 as the National Stage of International Application No, PCT/FR2018/050791, filed Mar. 29, 2018, entitled "WAVE ENERGY CONTROL DEVICE" which claims priority to French Application No. FR 1752718 filed with the Intellectual Property Office of France on Mar. 30, 2017 and entitled "WAVE ENERGY CONTROL DEVICE" both of which are incorporated herein by reference in their entirety for all purposes.

TECHNICAL FIELD

The present invention relates to a system for controlling the energy of waves propagating over the surface of a liquid, and to the use of such a system.

PRIOR ART

The problem of controlling the energy of waves, in particular in a marine environment, has been studied for several years, in particular in the context of conversion of this energy into electricity.

Systems for controlling the energy of waves do currently exist and are known to those skilled in the art, in particular because of the examples thereof given in the prior-art documents: US 2014/0260236 A1, U.S. Pat. Nos. 4,255,066 A and 9,303,617 B2. In the latter, the technologies employed use bathymetric changes (changes in water depth) to control the waves, and these systems propose to construct, under the water, fixed and rigid structures having a particular arrangement.

However, these systems are rarely used on the open sea or near to the coast because they are too expensive, difficult to install, and impossible to move or to remove. In addition, they are usable only in shallow water and turn out to be ineffective ways of harvesting energy.

There is therefore a real need for a system that mitigates these faults, drawbacks and obstacles of the prior art, and in particular for a flexible and movable system that allows the energy of waves to be controlled whatever the depth of the liquid, the cost of manufacture and installation to be decreased, and the harvest of the energy of the waves to be improved with a view to allowing it to be subsequently converted into electricity.

DESCRIPTION OF THE INVENTION

To overcome the aforementioned drawbacks, one subject of the invention is a system for controlling hydroelastic waves on the surface of a liquid comprising a composite structure having at least two zones Z1 and Z2, of respective bending coefficients D1 and D2 defined by the equation:

$$D_i = \frac{E_i \cdot e_i^3}{12 \cdot (1 - v_i^2)}$$

where $E_i$ is the Young's modulus of the zone Zi, $e_i$ is the thickness of the zone Zi, and $v_i$ is the Poisson's ratio of the zone Zi, i being equal to 1 or 2, and of internal mechanical tensions $T_1$ and $T_2$, respectively;

the composite structure being adapted to, when the controlling system is placed on the surface of the liquid such that a hydroelastic surface wave propagates through the first zone Z1 then through the second zone Z2 of the composite structure floating on the surface of the liquid of density ρ, and when the wavelength $\lambda_i$ of the hydroelastic wave respects, in the zone Zi, the following equations:

$$\frac{2\pi}{\lambda_i} \geq \sqrt[4]{\frac{\rho \cdot g}{D_i}} \text{ and } \frac{2\pi}{\lambda_i} \geq \sqrt{\frac{T_i}{D_i}}$$

where g is the universal gravitational constant and i corresponds to the index of the zone Zi through which the hydroelastic wave is propagating, control the behavior of said hydroelastic wave via adjustment of said bending coefficients Di and/or of the shapes of said zones Zi.

So as to produce a compact system, the zones Z1 and Z2 may be contiguous.

Advantageously, the bending coefficients D1 and D2 are different because the zones Z1 and Z2 have different thicknesses $e_i$, and/or because the materials from which the zones Z1 and Z2 are made have different Young's moduli $E_i$ and/or different Poisson's ratios $v_i$.

In order to allow the waves to be controlled gradually, the variation in the bending coefficient between the passage from the zone Z1, of coefficient D1, to the zone Z2, of coefficient D2, is continuous.

Advantageously, it is possible to define the index $n_i$ of the zone Zi as being proportional to the inverse of the propagation speed $V_i$ of the hydroelastic waves in the zone Zi, the propagation speed $V_i$ being defined by the equation:

$$n_i \propto \frac{1}{V_i} = \sqrt{\frac{\rho \cdot \lambda_i^3}{D_i \cdot 8\pi^3}}$$

so that the index $n_i$ is equivalent to the refractive index of an optical medium, and such that the laws of geometric optics apply to the propagation of the hydroelastic waves propagating through the zones Zi.

According to these relationships, it is possible to produce a lens. To this end, the system may furthermore comprise a third zone Z3 and such that:
  the zones Z1, Z2 and Z3 are contiguous;
  the zones Z1 and Z3 are of same index $n_1$ different from the index $n_2$ of the zone Z2, Z1 being the arrival zone of the hydroelastic waves and Z3 the exit zone; and
  the shapes of the interfaces between the zones are circular arcs of radius R such that the set {Z1, Z2, Z3} behaves as an optical lens of focal length f defined by the equation:

$$f = \frac{1}{2} \cdot \frac{R}{\frac{n_2}{n_1} - 1}.$$

The lens thus formed by the set {Z1, Z2, Z3} may be convergent if:
  the set has a biconvex-lens shape and $n_1 < n_2$; or if
  the set has a biconcave-lens shape and $n_1 > n_2$.

According to the same relationships, it is possible to deviate a hydroelastic wave in order to protect a device as an optical reflector does. To this end, the controlling system must be such that the zones Z1 and Z2 are contiguous, and of respective indices $n_1$ and $n_2$ respecting the following equations:

$$n_2 < n_1 \text{ and } \arcsin\left(\frac{n_2}{n_1}\right) < 45°,$$

the interface between the zones being a right angle the vertex of which is directed toward the side of the zone Z2 so that a hydroelastic wave arriving from the zone Z1 is reflected on contact with the interface between the zones Z1 and Z2 and leaves along an axis parallel to its direction of incidence.

Advantageously, at least one of the zones Zi is composed of a matrix of floating pads that are connected by elastic linking means so that the matrix behaves as an effective zone Zeff_i of effective bending coefficient $D_{\mathit{eff\_i}}$ defined by the equation:

$$D_{\mathit{eff\_i}} = \frac{E_{\mathit{eff\_i}} \cdot e_{\mathit{eff\_i}}^3}{12 \cdot (1 - v_{\mathit{eff\_i}}^2)}$$

where $E_{\mathit{eff\_i}}$ is the effective Young's modulus of the zone Zeff_i, $e_{\mathit{eff\_i}}$ is the effective thickness of the effective zone Zeff_i, and $v_{\mathit{eff\_i}}$ is the effective Poisson's ratio of the zone Zeff_i, and of effective internal mechanical tension Teff_i, i being equal to 1 or 2; the composite structure being adapted to, when the controlling system is placed on the surface of the liquid such that a hydroelastic surface wave propagates through the first zone Z1 or Zeff_1 then through the second zone Z2 or Zeff_2 of the composite structure floating on the surface of the liquid of density ρ, and when the wavelength $\lambda_i$ of the hydroelastic wave propagating through the zone Zi, respects the following equations:

$$\frac{2\pi}{\lambda_i} \geq \sqrt[4]{\frac{\rho \cdot g}{D_i}} \text{ and } \frac{2\pi}{\lambda_i} \geq \sqrt{\frac{T_i}{D_i}}$$

and the effective wavelength $\lambda_{\mathit{eff\_i}}$ of the wave propagating through the effective zone Zeff_i respects the following equations:

$$\frac{2\pi}{\lambda_{\mathit{eff\_i}}} \geq \sqrt[4]{\frac{\rho \cdot g}{D_{\mathit{eff\_i}}}} \text{ and } \frac{2\pi}{\lambda_{\mathit{eff\_i}}} \geq \sqrt{\frac{T_{\mathit{eff\_i}}}{D_{\mathit{eff\_i}}}}$$

where g is the universal gravitational constant and i corresponds to the index of the zone Zi or Zeff_i through which the hydroelastic wave is propagating, control the behavior of said hydroelastic wave via adjustment of said bending coefficients Di or $D_{\mathit{eff\_i}}$ and/or of the shapes of said zones Zi or Zeff_i.

According to a second aspect, the invention relates to the use of a lens-type system for controlling hydroelastic waves on the surface of a liquid, such as defined above, to harvest the energy of waves propagating on the surface of a liquid such that the composite structure of the system for controlling the waves is adapted to focus the hydroelastic waves on a point.

According to another aspect, the invention relates to the use of a reflector-type system for controlling waves on the surface of a liquid, such as defined above, to protect a device possessing a portion in contact with the surface of the liquid, the composite structure of the controlling system being adapted to protect the portion in contact with the surface of the liquid and reflecting the hydroelastic waves that would otherwise reach the device.

BRIEF DESCRIPTION OF THE FIGURES

The invention will be better understood on reading the following description, which is given merely by way of example, and with reference to the appended figures, in which.

EMBODIMENTS

Waves propagating over the surface of a liquid are called gravity-capillary waves. The frequency ω of these waves is related to their wavelength λ by the following gravity-capillary dispersion relationship:

$$\omega^2 = gk + \frac{\sigma}{\rho} \cdot k^3 \qquad (E1)$$

where:
g is the universal gravitational constant;
k is the wave number defined by:

$$k = \frac{2\pi}{\lambda} \qquad (E2)$$

σ is the surface tension of the liquid; and
ρ is the density of the liquid.

Figure 1:
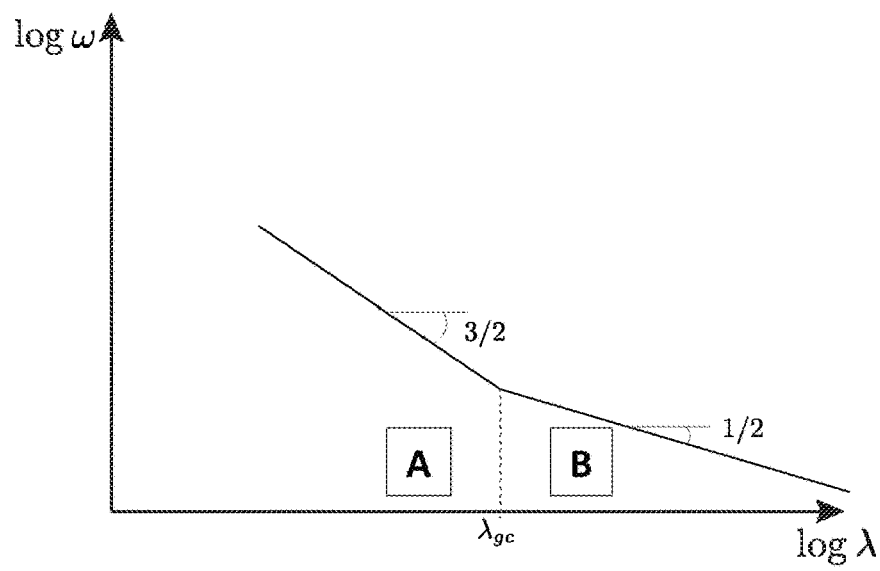
FIG. 1 shows the curve describing the variation in the dispersion relationship of a gravity-capillary wave.

FIG. 1 shows the curve describing the variation in the dispersion relationship (E1) of a gravity-capillary wave as a function of the frequency ω of the gravity-capillary wave and of its wavelength λ. This function comprises two regimes:

A—the capillarity (or tension) regime at short wavelengths λ; and

B—the gravitational regime at long wavelengths λ.

In the capillarity (or tension) regime, the predominant mechanical restoring force acting on the waves is the surface tension of the liquid whereas in the gravitational regime, it is the force of gravity that predominates.

The wavelength that separates these two regimes is called the gravity-capillary length $\lambda_{gc}$ and is equal to:

$$\lambda_{gc} = 2\pi \sqrt{\frac{\sigma}{\rho g}} \tag{E3}$$

When a film of elastic material is deposited on the surface of the liquid and no other force than that exerted by the liquid on the film is applied, the dispersion relationship of the wave changes and becomes:

$$\omega^2 = \left(gk + \frac{T}{\rho} \cdot k^3 + \frac{D}{\rho} \cdot k^5\right) \cdot \tanh kH \tag{E4}$$

where:

T is the internal mechanical tension of the film of elastic material, which in this case is equal to the surface tension σ of the liquid;

D is the bending modulus of the film applied to the liquid; and

H is the height of liquid present under the film.

The bending modulus is for its part defined by equation E5:

$$D = \frac{E \cdot e^3}{12 \cdot (1 - v^2)} \tag{E5}$$

where:

E is the Young's modulus of the film;

e is the thickness of the film; and v is the Poisson's ratio of the film.

Figure 2:
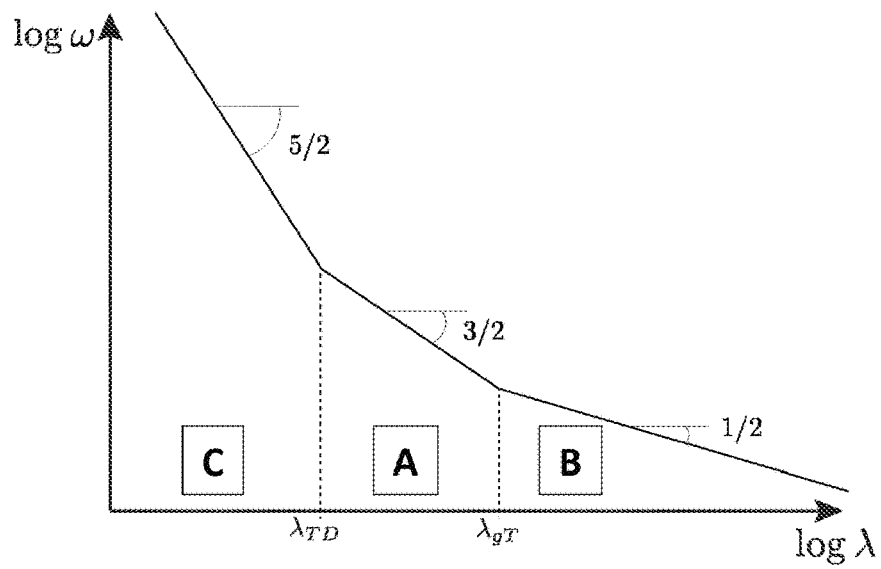
FIG. 2 shows the curve describing the variation in the dispersion relationship of a wave propagating over the surface of a liquid covered with a film of elastic material.

FIG. 2 shows the new curve describing the variation in the dispersion relationship (E4) of a wave propagating through a film of elastic material placed on the surface of a liquid, A third regime may be seen on this new curve:

C—the bending regime or the hydroelastic-wave regime in which the dominant mechanical restoring force is that of the film of elastic material.

Thus, hydroelastic waves are waves the wavelength λ, of which respects the following equations:

$$k = \frac{2\pi}{\lambda} \geq \sqrt[4]{\frac{\rho \cdot g}{D}} \quad \text{and} \tag{E6}$$

$$k = \frac{2\pi}{\lambda} \geq \sqrt{\frac{T}{D}} \tag{E7}$$

Figure 3A:
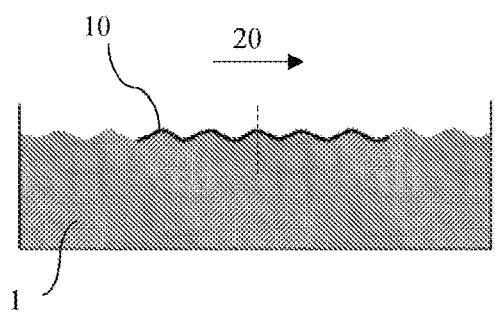
FIGS. 3a and 3b show a profile view and a view from above of a composite structure of a system for controlling hydroelastic waves according to one general embodiment of the invention, respectively.

FIGS. 3a et 3b show a profile view and a view from above of a system for controlling hydroelastic waves on the surface of a liquid 1 according to a first general embodiment of the invention.

It comprises a composite structure 10 comprising two zones Z1 and Z2, of respective bending coefficients D1 and D2 defined by equation E5a:

$$D_i = \frac{E_i \cdot e_i^3}{12 \cdot (1 - v_i^2)} \tag{E5a}$$

where:

$E_i$ is the Young's modulus of the zone Zi, $e_i$ is the thickness of the zone Zi, and $v_i$ is the Poisson's coefficient of the zone Zi i being equal to 1 or 2, and of internal mechanical tensions T1 and T2, respectively.

The composite structure 10 is adapted to, when the controlling system is placed on the surface of the liquid 1 such that a hydroelastic surface wave propagates in the direction 20, namely through the first zone Z1 then through the second zone Z2 of the composite structure 10 floating on the surface of the liquid 1 of density ρ, and when the wavelength $\lambda_i$ of the hydroelastic wave respects, in the zone Zi, equations E6a and E7a:

$$\frac{2\pi}{\lambda_i} \geq \sqrt[4]{\frac{\rho \cdot g}{D_i}} \quad \text{and} \tag{E6a}$$

$$k_i = \frac{2\pi}{\lambda_i} \geq \sqrt{\frac{T_i}{D_i}} \tag{E7a}$$

where g corresponds to the universal gravitational constant and i corresponds to the index of the zone Zi through which the hydroelastic wave is propagating, control the behavior of the hydroelastic wave.

In the bending regime, the hydroelastic waves are therefore subjected to the force applied by the composite structure on the surface of the liquid, this allowing the propagation of these waves to be controlled via the choice of the material used (and therefore of the Young's moduli $E_1$ and $E_2$ and the Poisson's ratios $v_1$ and $v_2$) in the zones Z1 and Z2, the thickness $e_i$ of these zones and/or also the shape of these zones.

Figure 3B:
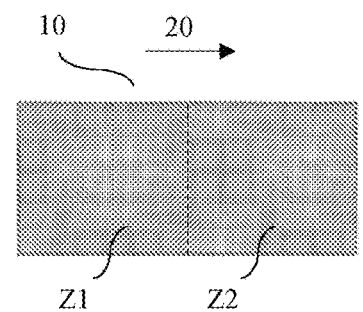

So as to obtain a compact system, but also in order to facilitate the manufacture of the composite structure 10, in particular in the case where the zones Z1 and Z2 are made of the same material, the zones Z1 and Z2 may be contiguous as illustrated in FIG. 3.

Figure 4:
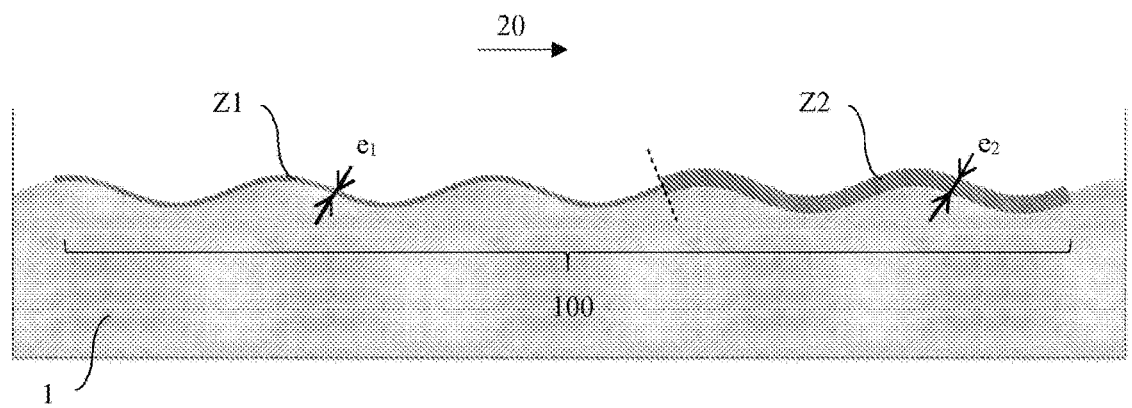
FIG. 4 shows a composite structure of a system for controlling hydroelastic waves according to a first variant of the general embodiment of the invention.

Advantageously, the bending coefficients D1 and D2 are different, the zones Z1 and Z2 having different thicknesses $e_i$, and/or the zones Z1 and Z2 being made of materials having different Young's moduli $E_i$ and/or different Poisson's ratios $v_i$. FIG. 4 shows the case of a composite structure 100 made up of two zones Z1 and Z2 of different thicknesses $e_i$ according to a second embodiment of the invention.

In order to allow the hydroelastic waves to be gradually controlled and also to facilitate the manufacture of the composite structure 10, the variation in the bending coefficient between the passage from the zone Z1, of coefficient D1, to the zone Z2, of coefficient Z2, may be continuous, the thickness of the material used to produce the zones Z1 and Z2 for example being gradually varied.

To draw a parallel with optics, it is possible to define an index $n_i$ of the zone Zi as being proportional to the inverse of the propagation speed Vi of the hydroelastic waves in the zone Zi. The propagation speed Vi is defined by equation E8:

$$n_i \propto \frac{1}{V_i} = \sqrt{\frac{\rho \cdot \lambda_i^3}{D_i \cdot 8\pi^3}} \quad \text{(E8)}$$

so that the index $n_i$ is equivalent to the refractive index of an optical medium, and such that the laws of geometric optics apply to the propagation of the hydroelastic waves propagating through the zones Zi.

Thus, it is possible to define composite structures having the same behavior as the optical elements but for hydroelastic waves only.

According to the embodiment shown in FIG. 4, the zones Z1 and Z2 are made from the same material, their Young's moduli $E_i$ and Poisson's ratios $v_i$ therefore being equal, only their thicknesses being different with $e_1 < e_2$.

According to the definition of the index $n_i$ as being proportional to the inverse of the propagation speed Vi of the hydroelastic waves through the zone Zi, the ratio of the indices of the zones Z1 and Z2 may be expressed as below:

$$\frac{n_1}{n_2} = \frac{V_2}{V_1} = \left(\frac{D_2}{D_1}\right)^{1/5} = \left(\frac{e_2}{e_1}\right)^{3/5} \quad \text{(E9)}$$

Thus if $e_1 < e_2$ then $n_1 > n_2$. According to the laws of geometric optics, in particular Snell's law:

$$n_1 \sin i_1 = n_2 \sin i_2 \quad \text{(E10)}$$

with $i_1$ being the angle of incidence of the beam with respect to the normal to the dioptric interface formed between Z1 and Z2, and $i_2$ being the angle of exit of the beam with respect to the normal to the dioptric interface: $n_1 > n_2$ is equivalent to saying $i_2 > i_1$.

Figure 5:
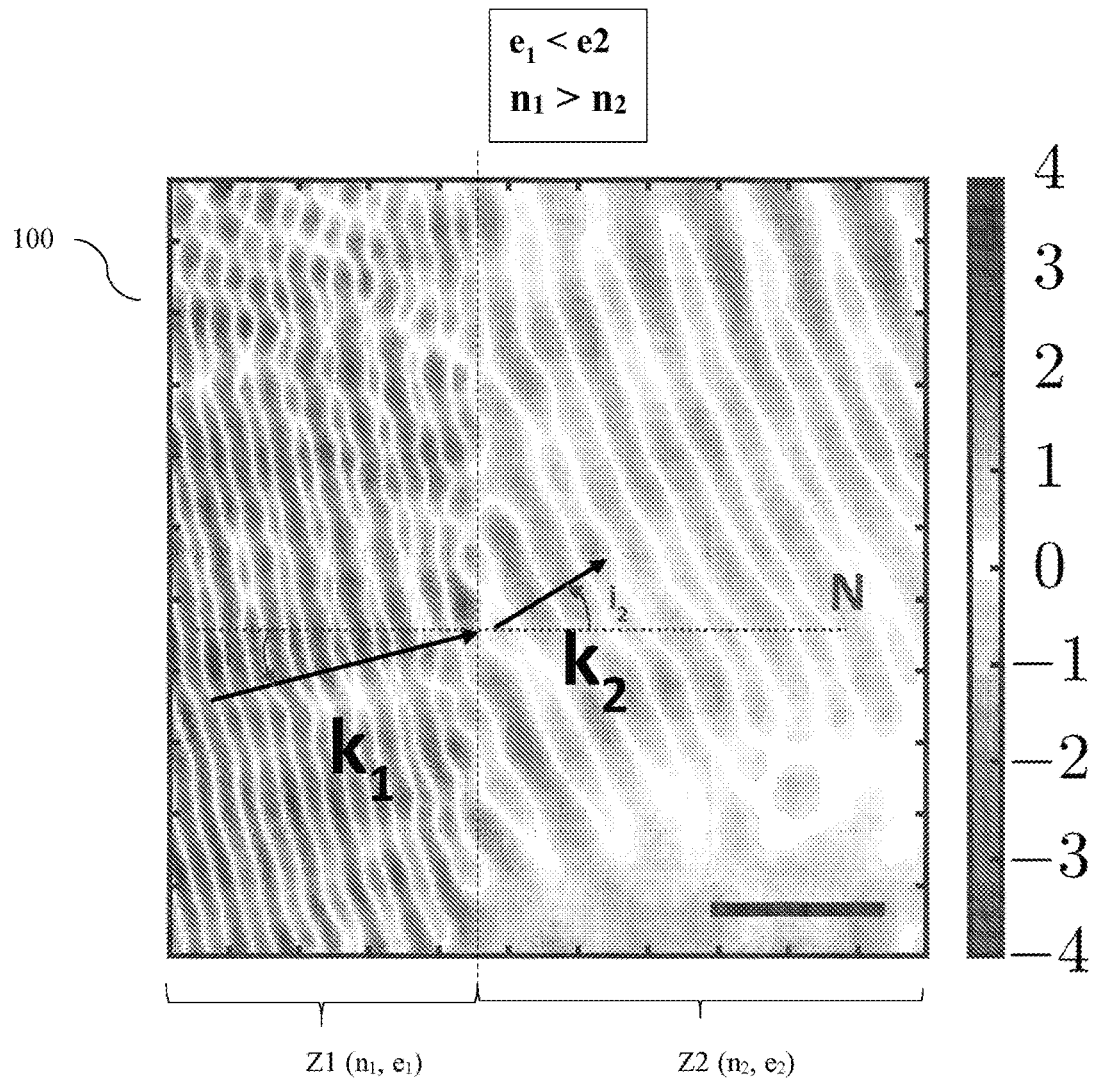
FIG. 5 shows the behavior of a hydroelastic wave propagating over the surface of a liquid equipped with a system for controlling hydroelastic waves according to the first variant of the general embodiment of the invention.

FIG. 5 shows the behavior, seen from above, of a hydroelastic wave filmed in the laboratory and propagating over a composite structure 100 such as defined above. The grayscale located by the side of the figure shows the height of the wave with respect to the average position of the surface of the liquid at rest, which is located at 0.

In this experiment, the incident plane hydroelastic wave of direction $k_1$ propagates through the zone Z1 then through the zone Z2. The direction $k_2$ of the hydroelastic wave in this zone Z2 indeed diverges from the normal N at the interface between the zones Z1 and Z2, namely $i_2 > i_1$.

Figure 6:
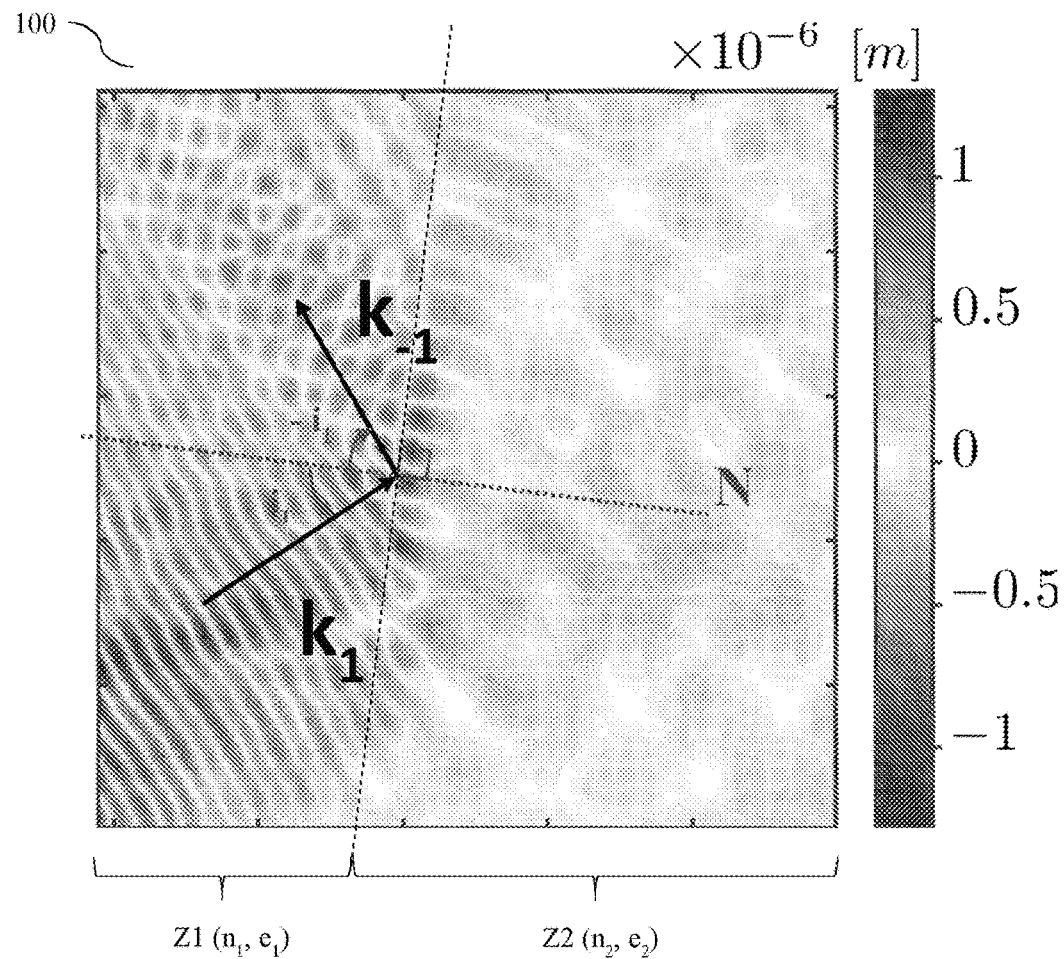
FIG. 6 shows the behavior of a hydroelastic wave propagating, in one particular case, over the surface of a liquid equipped with a system for controlling hydroelastic waves according to the first variant of the general embodiment of the invention.

According to the laws of geometric optics, an incident plane hydroelastic wave the direction $k_1$ of which makes an angle $i_i$ larger than the angular limit of refraction defined by:

$$i_{lim} = \arcsin\left(\frac{n_2}{n_1}\right) \quad \text{(E11)}$$

will be entirely reflected at the interface between the zones Z1 and Z2 for example allowing infrastructure located at sea to be protected. FIG. 6 illustrates this particular case.

By virtue of these laws, it is also possible to produce a composite structure that forms a convergent lens.

Figure 7A:
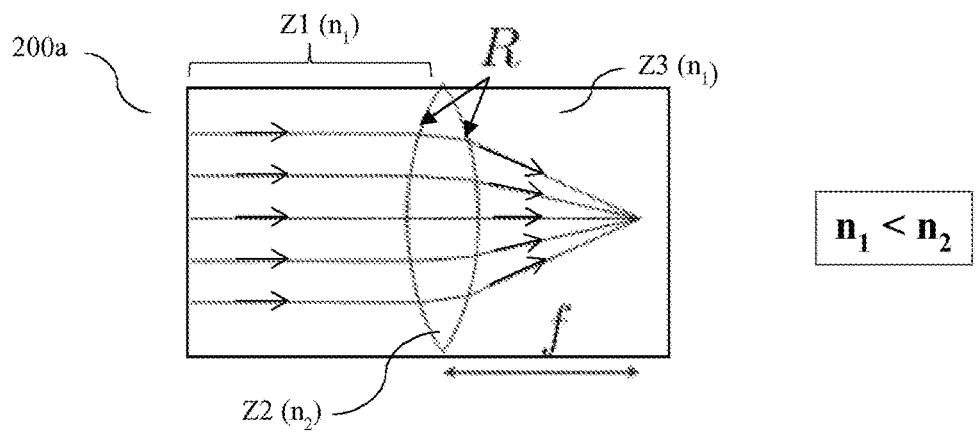
FIGS. 7a and 7b show two variants of a composite structure of a system for controlling hydroelastic waves according to a second variant of the general embodiment of the invention.

FIGS. 7a et 7b show two particular embodiments of the invention allowing a convergent lens capable of focusing the energy of the hydroelastic waves propagating on the composite structure to be focused on a point.

The composite structure 200a illustrated in FIG. 7a is composed of three contiguous zones Z1, Z2 and Z3. The zones Z1 and Z3 are of the same index $n_1$, such as defined above (i.e. $n_i$ is proportional to the inverse of the propagation speed Vi in the zone Zi). The index $n_2$ of the zone Z2 is for its part different from $n_1$, and such that $n_1 < n_2$.

The zone Z2 has the shape of a biconvex lens of radius of curvature R. In other words, the interface between the zones Z1 and Z2 is a circular arc of radius R the curvature of which is turned toward the side of the zone Z1, from which zone the waves arrive, and the interface between the zones Z2 and Z3 is also a circular arc of radius R, the curvature of which is turned toward the side of the zone Z3, via which zone the waves exit.

Thus, a plane hydroelastic wave that propagates from the zone Z1 to the zone Z2 then Z3 of the composite structure 200a is focused in the focal plane of the lens thus produced.

Figure 7B:
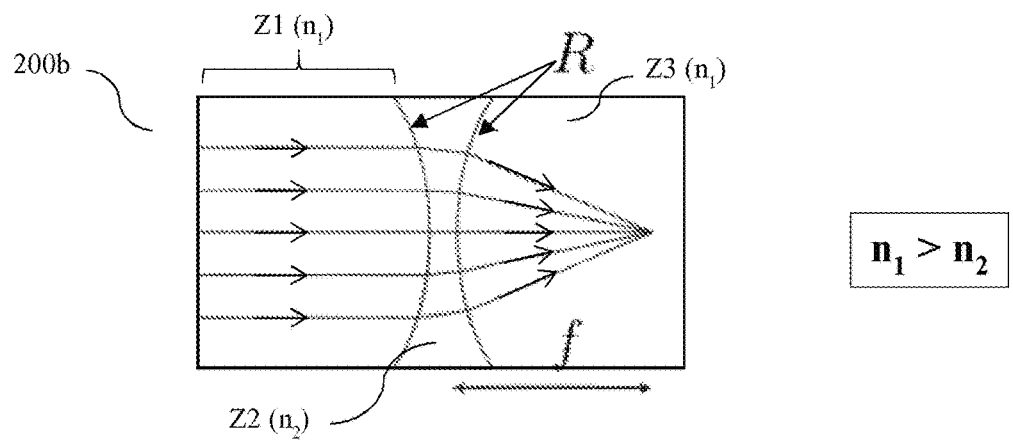

The composite structure 200b illustrated in FIG. 7b proposes another embodiment of a convergent lens. In this configuration, the composite structure 200b is also composed of three contiguous zones Z1, Z2 and Z3. The zones Z1 and Z3 are of same index $n_1$, and the zone Z2 is of index $n_2$ such that $n_1 > n_2$.

In this configuration, the zone Z2 has the shape of a biconcave lens of radius of curvature R. In other words, the interface between the zones Z1 and Z2 is a circular arc of radius R the radius of curvature of which is turned toward the side of the zone Z2, and the interface between the zones Z2 and Z3 is also a circular arc of radius R, the radius of curvature of which is also turned toward the side of zone Z2.

In the same way, a plane hydroelastic wave that propagates from zone Z1 to zone Z2 then Z3 of the composite structure 200b is focused in the focal plane of the lens thus produced.

The focal length f of these lenses may be defined as follows:

$$f = \frac{R}{2\left(\frac{n_2}{n_1} - 1\right)} \quad \text{(E12)}$$

A system for controlling hydroelastic surface waves comprising one of the composite structures 200a and 200b such as defined above may therefore advantageously be used to harvest the energy of hydroelastic waves propagating over the surface of a liquid on which the controlling structure is installed, the latter being adapted to focus the waves on a point, just like a convergent lens.

Thus, such a structure will make it possible to improve the performance of a device placed at the focal point of the composite structure 200a or 200b and capable of converting the energy of the received hydroelastic waves into electrical power for example, such as the devices used at sea that allow wave energy to be converted into electricity.

Reciprocally, it is also possible to create divergent lenses. To do this, the shape of the zones and of the interfaces is the same as that described above with the exception that when the zone Z2 has a biconvex shape, the index $n_1$ must be higher than $n_2$ and when the zone Z2 has a biconcave shape, the index $n_1$ must be lower than $n_2$.

Figure 8:
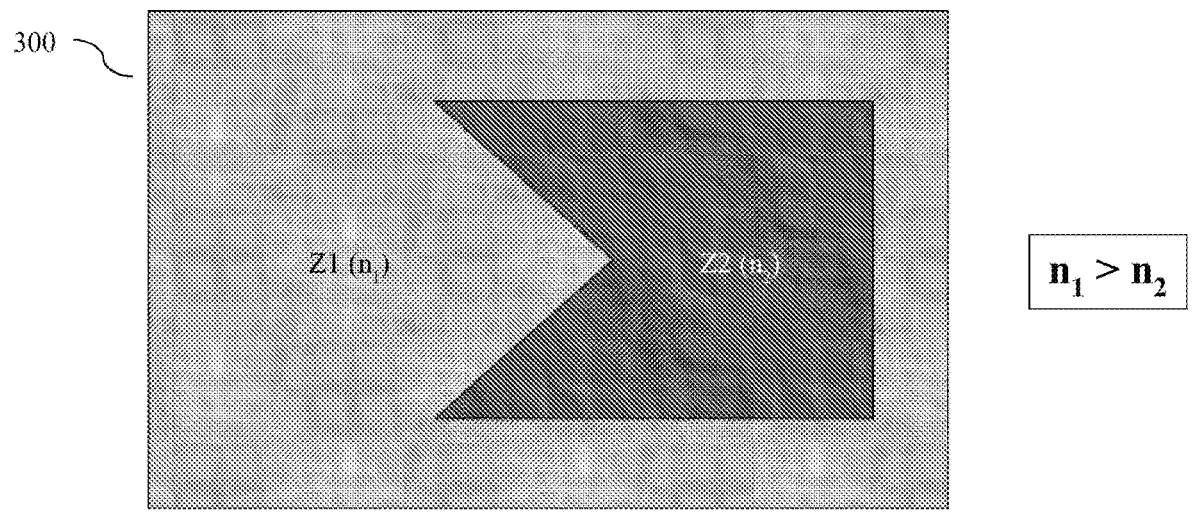
FIG. 8 shows a composite structure of a system for controlling hydroelastic waves according to a third variant of the general embodiment of the invention.

FIG. 8 shows another particular embodiment of the invention. In this embodiment the composite structure 300 may be considered to be a wave reflector and uses the principle of the angular limit of refraction defined above.

In this configuration, the composite structure 300 is made up of two contiguous zone Z1 and Z2, of respective indices $n_1$ and $n_2$ respecting the following equations E13 and E14:

$$n_2 < n_1 \tag{E13}$$

and $$i_{lim} = \arcsin\left(\frac{n_2}{n_1}\right) < 45° \tag{E14}$$

The interface between the zones Z1 and Z2 is a right angle the vertex of which is directed toward the side of the zone Z2 so that a hydroelastic wave arriving from the zone Z1 is refracted twice, like a light beam, on contact with the interface between the zones Z1 and Z2 and leaves along an axis parallel to its direction of incidence, as is the case for a "corner cube" or optical reflector.

A system for controlling hydroelastic surface waves comprising a composite structure 300 such as defined above may advantageously be used to protect a device, such as a nuclear power plant, possessing a portion in contact with the surface of the liquid, the composite structure 300 being adapted to protect the portion in contact with the surface of the liquid and for reflecting the hydroelastic waves reaching the device.

The use of this kind of system on the open sea or over a large extent of liquid would be difficult and expensive to implement if the zones Zi were continuous and made from a single material, as a continuous film. Thus, according to one option compatible with the embodiments described above, it may be advantageous to produce composite zones Zi or effective zones Zeff_i.

Figure 9:
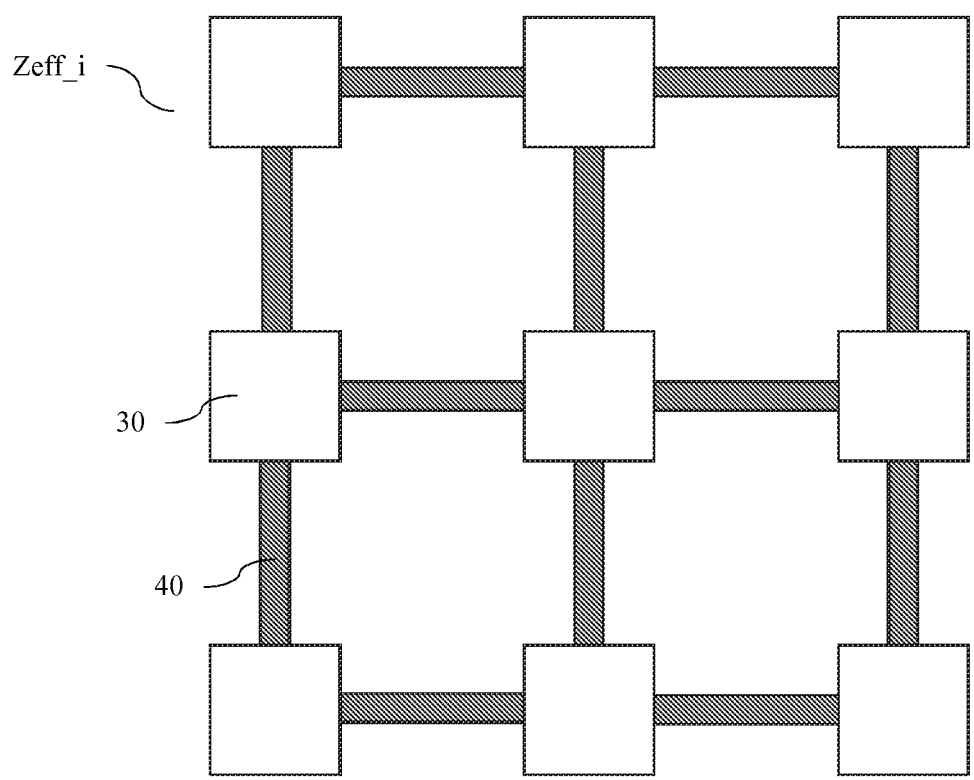
FIG. 9 shows an effective zone of a system for controlling hydroelastic waves according to one embodiment of the invention.

FIG. 9 shows one embodiment of such an effective zone Zeff_i.

In this embodiment, the zone Zeff_i is composed of a matrix of floating pads (30) that are connected by elastic linking means (40). It is then possible to define the effective bending coefficient of the effective zone Zeff_i using equation (E 15):

$$D_{\mathit{eff}\_i} = \frac{E_{\mathit{eff}\_i} \cdot e_{\mathit{eff}\_i}^3}{12 \cdot (1 - v_{\mathit{eff}\_i}^2)} \tag{E15}$$

where $E_{\mathit{eff}\_i}$ is the effective Young's modulus of the zone Zeff_i, $e_{\mathit{eff}\_i}$ is the effective thickness of the effective zone Zeff_i, and $v_{\mathit{eff}\_i}$ is the effective Poisson's ratio of the zone Zeff_i, i being equal to 1 or 2, and of effective internal mechanical tensions Teff_1 and Teff_2, respectively.

The composite structure is then adapted to, when the controlling system is placed on the surface of the liquid such that a hydroelastic surface wave propagates through the first zone Z1 or Zeff_1 then through the second zone Z2 or Zeff_2 of the composite structure floating on the surface of the liquid of density ρ, and when the wavelength $\lambda_i$ of the hydroelastic wave propagating through the zone Zi respects equations (E6a) and (E7a), and the effective wavelength $\lambda_{\mathit{eff}\_i}$ of the wave propagating through the effective zone Zeff_i respects the following equations, equations (E16) and (E17):

$$\frac{2\pi}{\lambda_{\mathit{eff}\_i}} \geq \sqrt[4]{\frac{\rho \cdot g}{D_{\mathit{eff}\_i}}} \tag{E16}$$

and $$\frac{2\pi}{\lambda_{\mathit{eff}\_i}} \geq \sqrt{\frac{T_{\mathit{eff}\_i}}{D_{\mathit{eff}\_i}}} \tag{E17}$$

where g is the universal gravitational constant and i corresponds to the index of the zone Zi or Zeff_i through which the hydroelastic wave is propagating.

By defining an effective index $n_{\mathit{eff}\_i}$ on the basis of the effective propagation speed Veff_i of the hydroelastic waves in the effective zone Zeff_i, it is thus possible to create, via adjustment of the bending coefficients Di or Deff_i and/or of the shapes of said zones Zi or Zeff_i, components that respect the laws of geometric optics such as a Fresnel lens or a corner cube/reflector usable to focus or reflect hydroelastic waves on a large area of liquid while reducing the materials required to manufacture an equivalent controlling system.

Advantageously, the materials used to produce the controlling systems and devices described above may be biodegradable so as not to pollute the liquid on which they are installed, and thus to allow them to be used for a certain time without requiring physical removal thereof and therefore the cost of deinstallation to be avoided.

The invention has been illustrated and described in detail in the drawings and the above description. The latter must be considered to be illustrative and to have been given by way of example, and the invention must not be considered to be limited to this description alone. Many variant embodiments are possible.

LIST OF REFERENCE NUMBERS

1 Liquid
10 System for controlling hydroelastic surface waves of a liquid according to a first embodiment
20 Direction of propagation of the waves
30 Floating pad
40 Elastic linking means
100 Composite structure
200a Biconvex-lens-type composite structure
200b Biconcave-lens-type composite structure
300 "cCorner cube" type composite structure/reflector

The invention claimed is:

1. A system for controlling hydroelastic waves on the surface of a liquid (1) comprising a composite structure (10) having at least two zones Z1 and Z2, of respective bending coefficients D1 and D2 defined by the equation:

$$D_i = \frac{E_i \cdot e_i^3}{12 \cdot (1 - v_i^2)}$$

where $E_i$ is the Young's modulus of the zone Zi, $e_i$ is the thickness of the zone Zi, and $v_i$ is the Poisson's ratio of the zone Zi, i being equal to 1 or 2, and of internal mechanical tensions $T_1$ and $T_2$, respectively;

the composite structure (10) being adapted to, when the controlling system is placed on the surface of the liquid (1) such that a hydroelastic surface wave propagates through the first zone Z1 then through the second zone Z2 of the composite structure (10) floating on the surface of the liquid (1) of density ρ, and when the wavelength $\lambda_i$ of the hydroelastic wave respects, in the zone Zi, the following equations:

$$\frac{2\pi}{\lambda_i} \geq \sqrt[4]{\frac{\rho \cdot g}{D_i}}$$

and $$\frac{2\pi}{\lambda_i} \geq \sqrt{\frac{T_i}{D_i}}$$

where g is the universal gravitational constant and i corresponds to the index of the zone Zi through which the hydroelastic wave is propagating, control the behavior of said hydroelastic wave via adjustment of said bending coefficients Di and/or of the shapes of said zones Zi.

2. The system as claimed in claim 1, wherein the zones Z1 and Z2 are contiguous.

3. The system as claimed in claim 1, wherein the bending coefficients D1 and D2 are different because of differences between thicknesses and/or because of differences between the Young's moduli $E_i$ and/or different Poisson's ratios $v_i$ of the materials from which the zones Z1 and Z2 are made.

4. The system as claimed in claim 3, wherein the variation in the bending coefficient between the passage from the zone Z1, of coefficient D1, to the zone Z2, of coefficient D2, is continuous.

5. The system as claimed in claim 1, wherein, having defined the index $n_i$ of the zone Zi as being proportional to the inverse of the propagation speed $V_i$ of the hydroelastic waves in the zone Zi, the propagation speed $V_i$ is defined by the equation:

$$n_i \propto \frac{1}{V_i} = \sqrt{\frac{\rho \cdot \lambda_i^3}{D_i \cdot 8\pi^3}}$$

so that the index $n_i$ is equivalent to the refractive index of an optical medium, and such that the laws of geometric optics apply to the propagation of the hydroelastic waves propagating through the zones Zi.

6. The system as claimed in claim 5, furthermore comprising a third zone Z3 and such that:
the zones Z1, Z2 and Z3 are contiguous;
the zones Z1 and Z3 are of same index $n_1$ different from the index $n_2$ of the zone Z2, Z1 being the arrival zone of the hydroelastic waves and Z3 the exit zone; and
the shapes of the interfaces between the zones are circular arcs of radius R such that the set {Z1, Z2, Z3} behaves as an optical lens of focal length f defined by the equation:

$$f = \frac{1}{2} \cdot \frac{R}{\frac{n_2}{n_1} - 1}.$$

7. The system as claimed in claim 6, wherein the lens formed by the set {Z1, Z2, Z3} is convergent if:
the set has a biconvex-lens shape and $n_1 < n_2$; or if
the set has a biconcave-lens shape and $n_1 > n_2$.

8. The use of a system for controlling hydroelastic surface waves as claimed in claim 7 to harvest the energy of waves propagating on the surface of a liquid such that the composite structure (200a or 200b) of the system for controlling the waves is adapted to focus the hydroelastic waves on a point.

9. The system as claimed in claim 5, wherein the zones Z1 and Z2 are contiguous, and of respective indices $n_1$ and $n_2$ respecting the equations:

$$n_2 < n_1 \text{ and } \arcsin\left(\frac{n_2}{n_1}\right) < 45°,$$

the interface between the zones being a right angle the vertex of which is directed toward the side of the zone Z2 so that a hydroelastic wave arriving from the zone Z1 is reflected on contact with the interface between the zones Z1 and Z2 and leaves along an axis parallel to its direction of incidence.

10. The use of a system for controlling hydroelastic surface waves as claimed in claim 9 to protect a device possessing a portion in contact with the surface of the liquid, the composite structure (300) of the system being adapted to protect the portion in contact with the surface of the liquid and reflecting the hydroelastic waves that would otherwise reach the device.

11. The system as claimed in claim 1, wherein at least one of the zones Zi is composed of a matrix of floating pads (30) that are connected by elastic linking means (40) so that the matrix behaves as an effective zone Zeff_i of effective bending coefficient $D_{\mathit{eff\_i}}$ defined by the equation:

$$D_{\mathit{eff\_i}} = \frac{E_{\mathit{eff\_i}} \cdot e_{\mathit{eff\_i}}^3}{12 \cdot (1 - v_{\mathit{eff\_i}}^2)}$$

where $E_{\mathit{eff\_i}}$ is the effective Young's modulus of the zone Zeff_i, $e_{\mathit{eff\_i}}$ is the effective thickness of the effective zone Zeff_i, and $v_{\mathit{eff\_i}}$ is the effective Poisson's ratio of the zone Zeff_i, and of effective internal mechanical tension Teff_i, i being equal to 1 or 2;
the composite structure being adapted to, when the controlling system is placed on the surface of the liquid (1) such that a hydroelastic surface wave propagates through the first zone Z1 or Zeff_1 then through the second zone Z2 or Zeff_2 of the composite structure floating on the surface of the liquid (1) of density ρ, and when the wavelength $\lambda_i$ of the hydroelastic wave propagating through the zone Zi, respects the following equations:

$$\frac{2\pi}{\lambda_i} \geq \sqrt[4]{\frac{\rho \cdot g}{D_i}}$$

and $$\frac{2\pi}{\lambda_i} \geq \sqrt{\frac{T_i}{D_i}}$$

and the effective wavelength $\lambda_{\mathit{eff\_i}}$ of the wave propagating through the effective zone Zeff_i respects the following equations:

$$\frac{2\pi}{\lambda_{\textit{eff}\_i}} \geq \sqrt[4]{\frac{\rho \cdot g}{D_{\textit{eff}\_i}}}$$

and $$\frac{2\pi}{\lambda_{\textit{eff}\_i}} \geq \sqrt{\frac{T_{\textit{eff}\_i}}{D_{\textit{eff}\_i}}}$$

where g is the universal gravitational constant and i corresponds to the index of the zone Zi or Zeff_i through which the hydroelastic wave is propagating, control the behavior of said hydroelastic wave via adjustment of said bending coefficients Di or $D_{\textit{eff}\_i}$ and/or of the shapes of said zones Zi or Zeff_i.

\* \* \* \* \*